United States Patent
Goodson, Jr.

(10) Patent No.: US 6,681,849 B2
(45) Date of Patent: Jan. 27, 2004

(54) DOWNHOLE PACKER SYSTEM UTILIZING ELECTROACTIVE POLYMERS

(75) Inventor: James Edward Goodson, Jr., Porter, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/935,182

(22) Filed: Aug. 22, 2001

(65) Prior Publication Data

US 2003/0037921 A1 Feb. 27, 2003

(51) Int. Cl.$^7$ .............................................. E21B 23/04
(52) U.S. Cl. ...................................... 166/66.5; 166/135
(58) Field of Search ................................. 166/66.5, 120, 166/134, 135, 192

(56) References Cited

U.S. PATENT DOCUMENTS

| | | | | |
|---|---|---|---|---|
| 4,424,865 A | * | 1/1984 | Payton, Jr. .................. | 166/302 |
| 5,128,408 A | | 7/1992 | Tanaka et al. ............. | 525/54.2 |
| 5,167,149 A | | 12/1992 | Mullins et al. ................ | 73/155 |
| 5,201,220 A | | 4/1993 | Mullins et al. ................ | 73/155 |
| 5,609,353 A | | 3/1997 | Watson ....................... | 280/707 |
| 5,816,587 A | | 10/1998 | Stewart et al. ........... | 280/5.516 |
| 6,158,470 A | | 12/2000 | Ivers et al. ................. | 137/807 |
| 6,257,356 B1 | | 7/2001 | Wassell ....................... | 175/61 |
| 2002/0108747 A1 | * | 8/2002 | Dietz et al. ................ | 166/66.7 |

FOREIGN PATENT DOCUMENTS

| | | |
|---|---|---|
| EP | 0 581 476 | 2/1994 |
| GB | 2352464 | 1/2001 |
| WO | WO 99/22383 | 5/1999 |

OTHER PUBLICATIONS

"Mechanical and Structural Study of Magnetic Elastomers", Author: Virginie Posinet; American Physical Society Centennial Meeting, Program, WC36.04; Mar. 20–26, 1999. (Abstract only).

"The Field–Dependent Mechanical Properties of Magnetorheological Elastomers", Authors: John M. Ginder, Mark E. Nicols, Larry D. Elie & Janice L. Tardiff; American Physical Society Centennial Meeting, Program, WC36.03; Mar. 20–26, 1999. (Abstract only).

"Model of Magnetorheological Elastomers"; Author: L. C. Davis; Journal of Applied Physics, vol. 85, No. 6, Mar. 15,1999, pp. 3348–3351.

"MR Fluid, Foam and Elastomer Devices"; Authors: J. Davis Carlson & Mark R. Jolly; Mechatronics 10 (2000) pp. 555–569.

* cited by examiner

*Primary Examiner*—William Neuder
(74) *Attorney, Agent, or Firm*—Madan, Mossman & Sriram, P.C.

(57) ABSTRACT

Sealing elements for well packers and bridgeplugs may be constructed with magnetorheological elastomers or foams disposed about electromagnet windings set in an internal mandrel. The elastomer or foam stiffness properties are formulated for a low setting force compliance in the absence of a magnetic field. After deployment, the tool winding is energized to engage the magnetic field and raise the stiffness properties of the elastomer or foam. When the magnetic field is activated, the packer or bridgeplug has greater structural resistance to unwanted pressure displacement. When the field is de-energized, the sealing element relaxes to permit resetting or removal.

13 Claims, 2 Drawing Sheets

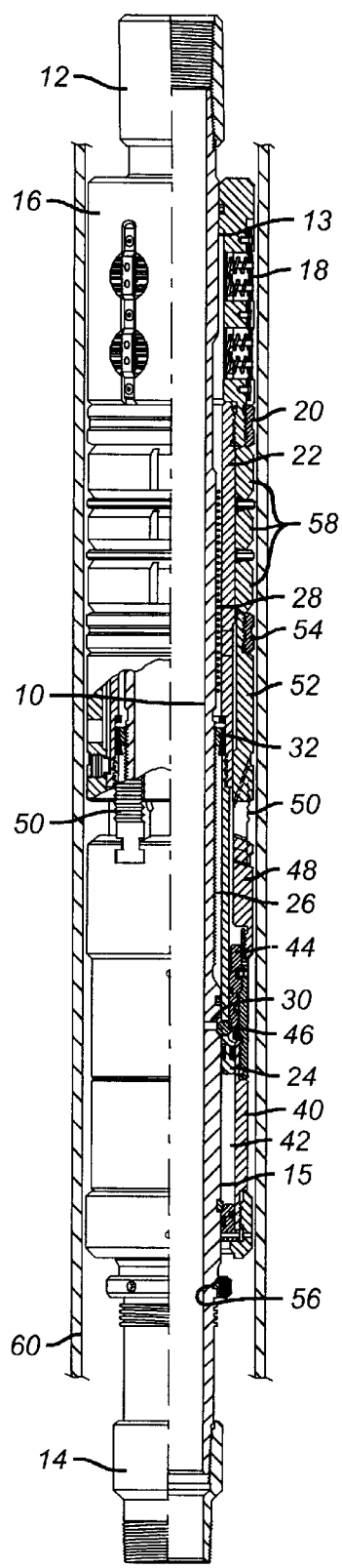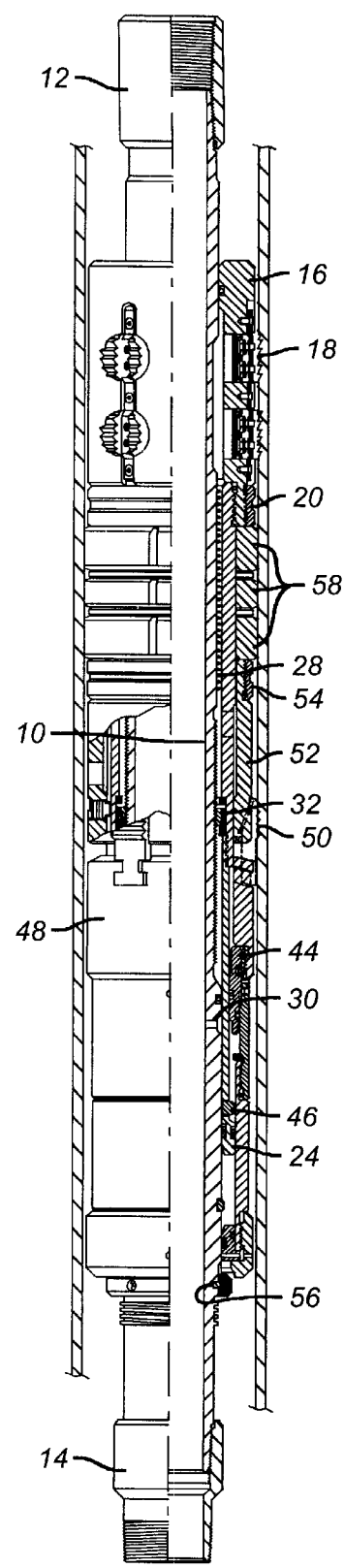
*FIG. 1*  *FIG. 2*

DOWNHOLE PACKER SYSTEM UTILIZING ELECTROACTIVE POLYMERS

BACKGROUND OF THE INVENTION

1. Field of the Invention

The present invention relates to the art of earth boring. In particular, the invention relates to packers, bridgeplugs and corresponding methods and apparatus for selectively obstructing and reopening a well flow channel.

2. Description of Related Art

Well pipe such as coiled or threaded production tubing, for example, is surrounded by an annular space between the exterior wall of the tubing and the interior wall of the well casing or borehole wall. Frequently, it is necessary to seal this annular space between upper and lower portions of the well depth. Appliances for accomplishing the sealing function are known in the well drilling arts as "packers". Traditionally, the sealing element of a packer is a ring of rubber or other elastomer that is in some manner secured and sealed to the interior well surface which may be the interior casing wall or the raw borehole wall. By compression, for example, the ring of rubber is expanded radially against the casing or borehole wall.

"Bridgeplugs" are well appliances for obstructing the flow continuity of an entire bore; whether it is the entire cross-section of the wellbore, the cross-section of a well casing or the cross-section of a production tube.

One of the greater utilities for a well packer or bridgeplug is to isolate a designated section of well bore along the wellbore length that penetrates a particular zone or earth strata. In some cases, the isolated zone may be burdened with an inordinately high internal pressure. For that reason, the packer or bridgeplug may be called upon to confine an unusually high pressure differential.

In other cases, where the packer engages the raw borehole wall to seal the annulus, for example, the packer must tightly and continuously engage a rough and highly irregular wall surface.

Either of the two examples above necessitate unusually high applications of setting force against the sealant to attain the degree rigidity and seal quality required with elastomers having the essential stiffness and other properties necessary to confine high differential pressure loads or expand into deep contours. However, high force and stress loads on a well tube also introduces the potential for other forms of tool and equipment failure.

It is an object of the present invention, therefore, to provide a well packer or bridgeplug having selectively controlled stiffness and other elastomer properties.

Also an object of the present invention is a packer or bridgeplug that may be engaged with relatively light force and when sealed, have the sealing element stiffened and rigidified.

Another object of the present invention is a well packer or bridgeplug having electromagnetically controlled stiffness properties.

Another object of the invention is a well packer or bridgeplug that is set with low force and stiffness properties which are thereafter switched or transformed to high stiffness properties and which may thereafter be switched or transformed back to the low stiffness property for retrieval of the packer if desired.

SUMMARY OF THE INVENTION

These and other objects of the invention as will be apparent from the following description of the preferred embodiments are attained by packers and bridgeplugs having a magnetorheological elastomer for the annulus or bore sealing element. Although the invention will be predominantly described in terms of a packer, it should be understood that the principles described are equally applicable to a bridgeplug.

"Controllable fluids" are materials that respond to an applied electric or magnetic field with a change in their rheological behavior. Typically, this change is manifested when the fluids are sheared by the development of a yield stress that is more or less proportional to the magnitude of an applied magnetic field. These materials are commonly referred to as electrorheological (ER) or magnetorheological (MR) fluids. Interest in controllable fluids derives from their ability to provide simple, quiet, rapid-response interfaces between electronic controls and mechanical systems. MR fluids are non-colloidal suspensions of polarizable particles having a size on the order of a few microns. Typical carrier fluids for magnetically responsive particles include hydrocarbon oil, silicon oil and water. The particulates in the carrier fluid may represent 25–45% of the total mixture volume. Such fluids respond to an applied magnetic field with a change in rheological behavior. Polarization induced in the suspended particles by application of an external field causes the particles to form columnar structures parallel to the applied field. These chain-like structures restrict the motion of the fluid, thereby increasing the viscous characteristics of the suspension.

Magnetorheological elastomers are magnetic field responsive elastomers that may be considered to be solid analogs of magnetic field responsive fluids. Like many field responsive fluids, field responsive elastomers are composed of polarizable particles dispersed in a polymer medium. The physical phenomena responsible for the field sensitivity of the elastomers is very similar to that of field responsive fluids. There are, however, some distinct differences in the way in which these two classes of materials are typically intended to operate. The most noteworthy is that the particle chains within the elastomer composite are intended to always operate in the pre-yield regime while field responsive fluids typically operate within a post-yield continuous shear or flow regime. Indeed, the strength of field responsive fluids is characterized by their field dependent yield stress while the strength of field responsive elastomers is typically characterized by their field dependent modulus.

Typically, during the manufacturing process for a magnetorheologncal elastomer, magnetic fields are applied to a polymer composite during crosslinking such that particle chain (columnar) structures form and become locked in place upon final cure. The formation of columnar particle structures within the elastomer composition corresponds to a low dipolar energy state. Flexure of the cured composite in the presence of the field causes particle displacement from this low energy state, thereby requiring additional work. In principle, this required additional work rises monotonically with applied field, thus resulting in a field dependent shear modulus.

Magnetorheological foams are devices that contain MR fluid that is constrained by capillary action in an absorbent matrix such as a sponge, open-celled foam, felt or fabric. The absorbent matrix serves to keep the MR fluid located in the active region of the device between the poles where the magnetic field is applied. The absorbent matrix requires only a minimum volume of MR fluid in the matrix to develop yield strength and resist shear motion. This basic arrangement may be applied in both linear and rotary devices wherever a direct shear mode would normally be used.

Because of their open structure, the shape of an MR fluid foam device is much less constrained than that of a normal controllable MR fluid device. Multiple degrees of freedom are easily accommodated.

Pursuant to the invention, packer seal elements are fabricated with magnetorheological elastomers or foams for disposition about an electromagnetic field winding embedded within and around a packer or bridgeplug mandrel. The winding may be connected by conductive cable to a surface power source. Alternatively, the winding may be powered by a circulating mud driven generator, for example.

For positioning downhole, the mandrel winding is de-energized. When positioned, the mandrel winding remains de-energized when the elastomer sealing elements are expanded to sealing engagement with the well bore or casing walls. After sealing, the mandrel windings are energized to stiffen the elastomer elements in the position and shape the elements were given while de-energized.

BRIEF DESCRIPTION OF THE DRAWINGS

For a thorough understanding of the present invention, reference is made to the following detailed description of the preferred embodiments, taken in conjunction with the accompanying drawing wherein:

FIG. 1 is a partially sectioned view of a retrievable packer tool constructed to incorporate the present invention with the elements aligned for well in-running.;

FIG. 2 illustrates a partially sectioned view of the invention in an operating set alignment to seal a well casing annulus;

DESCRIPTION OF THE PREFERRED EMBODIMENTS

Figure 3:
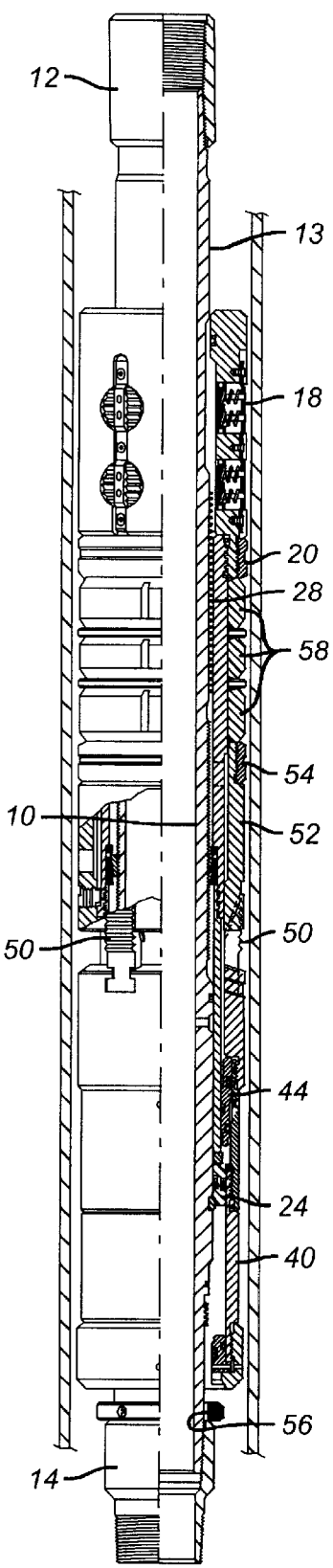
FIG. 3 illustrates a partially sectioned view of the invention with the elements aligned for retrieval from a well.

The invention is illustrated by reference to a retrievable packer tool application as shown graphically by FIGS. 1–3 which comprises a tubular inner mandrel 10 having an up-hole box end 12 and a down-hole pin end 14. Along the length of the mandrel outside surface is an upper seal surface 13 and a lower seal surface 15. Between the upper and lower seal surfaces is a buttress thread section 26 and an electromagnetic winding section 28. The windings 28 may be energized by a conduit extended into the well from a surface generator or by a circulation driven generator not shown.

A receptacle 16 fits concentrically around the inner mandrel upper seal surface 13 with a sliding seal fit. The receptacle carries several piston engaged casing slips 18 and an upper gage ring 20. A connector mandrel 22 is secured to the receptacle 16 by threads at its upper end and forms an annular piston 24 at its lower end. A lock ring 32 having a rectified mesh-fit with the buttress threads 26 links the connector mandrel 22 with the inner mandrel 10. The directional bias of the buttress threads 26 and lockring 32 permits relative axial displacement in only one axial direction.

A setting sleeve 40 is secured to and sealed around the lower end of the inner mandrel 10 to overlie the connector mandrel piston 24. The sleeve 40 forms an outer wall for an annular pressure cylinder 42. A retainer ring 46 is kept in an element retention position by a retainer piston 44.

Between an abutment end 48 of the setting sleeve 40 are a plurality of loosely assembled slips 50 and a sliding compression cone 52. The upper end of the compression cone is delineated by a lower gage ring 54. Between the upper cage ring 20 and the lower gage ring 54 are one or more elastomer packing elements 58.

The packing elements 58 may be NBR, HNBR, FEPM or FKM polymers compounded with about 10% to about 50% carbonyl iron, by volume, in the form of spherical shaped particles having a nominal size of about $1 \times 10^{-7}$ m, for example. Expansively, particle size may range from $1 \times 10^{-9}$ m to about $1 \times 10^{-5}$ m. Preferably, the elastomer is formulated for a relatively low durometer property in the de-energized state.

The in-running alignment of the packer elements is as illustrated by FIG. 1 with the retainer ring 46 set in the inner mandrel detent channel and confined by the skirt of the retainer piston 44. The packer elements 58 are uncompressed between the upper and lower gage rings 20 and 54. The electromagnet windings are de-energized and remain de-energized until the seal elements 58 are set.

When the packer is located at the desired downhole position as represented by FIG. 2, fluid pressure within the tubing flow bore is increased. The tubing pressure is a surface controlled parameter. The tubing pressure increase is transferred through the mandrel aperture 30 and brought to bear against the lower edge of the retainer piston 44. Resultantly, the piston is shifted upwardly and away from the retainer ring 46. When released, in situ well pressure against the connector mandrel piston 24 pulls the upper gage ring 20 compressively against the packer elements 58 and lower gage ring 54. Simultaneously, the slips 18 and 50 are set into the wall surface of casing 60.

Axial compression of the packer elements 58 expands the magnetorheological elastomer material radially into fluid-tight engagement with the inside walls of casing 60. A relatively low durometer and stiffness property of the packer elements 58 facilitates a tightly solid engagement of the packer elements with the casing wall. When set, the magnet windings 28 are energized to structurally rigidify the relatively soft elastomer 58. Hence, the packer seal elements 58 are initially set as a soft, readily deformed element. After setting, however, the packer elements 58 are maintained by the magnetic field as a hard but tightly embedded fluid seal.

In addition to the slip and seal element setting, the relative set position between the connector mandrel 22 and the inner mandrel 10 is secured by advancement of the lock ring 32 along the buttress thread 26.

Retrieval of the packer is represented by FIG. 3 whereby the winding 28 is de-energized and the tool string lifted to shear the lower shear ring 56. When the shear ring 56 fails, the slip setting sleeve 40 pulls away from the slips 50 to release the packer tool from the casing wall 60. Retraction of the slips 50 from the packer compression cone 52 releases the packer elements 58 of compressive stress. Since the packer elements are under no more stress and the magnetic field is terminated, the seal elements 58 are free to return to the original OD dimensions.

Although the invention has been described in terms of specified embodiments which are set forth in detail, it should be understood that the description is for illustration only and that the invention is not necessarily limited thereto, since alternative embodiments and operating techniques will become apparent to those of ordinary skill in the art in view of the disclosure. Accordingly, modifications are contemplated which can be made without departing from the spirit of the described and claimed invention.

What is claimed is:

1. A selectively deployed sealing element for a well flow channel, said sealing element being responsive to a magnetic field and having a low stiffness property for deployment and a selectively engaged high stiffness property for remaining in place.

2. A selectively deployed sealing element for a well flow channel as described by claim 1 wherein said flow channel is a well annulus.

3. A selectively deployed sealing element for a well flow channel as described by claim 1 wherein said sealing element is a well packer.

4. A selectively deployed sealing element for a well flow channel as described by claim 1 wherein said sealing element is a bridgeplug.

5. A selectively deployed sealing element for a well flow channel as described by claim 1 wherein said sealing element is a field controllable elastomer.

6. A selectively deployed sealing element for a well flow channel as described by claim 5 wherein said field controllable elastomer is a foam.

7. A well packer having an expandable packing element for sealing a well annulus and an actuator for expanding said packing element into operative engagement across said annulus, said packing element being formed of a magnetorheological material and having a first stiffness property for expansion across said annulus and a second stiffness property for remaining across said annulus.

8. A well packer as described by claim 7 wherein said expandable packing element comprises a magnetorheological elastomer.

9. A well packer as described by claim 7 wherein said expandable packing element comprises magnetorheological foam.

10. A well packer as described by claim 7 wherein said second stiffness property is maintained by a magnetic field.

11. A bridgeplug having an expandable sealing element, formed of a magnetorheological material, for sealing a well bore and an actuator for expanding said sealing element into operative engagement across said well bore, said bridgeplug having a first stiffness property for expansion across said well bore and a second stiffness property for remaining across said well bore.

12. A bridgeplug as described by claim 11 wherein said expandable sealing element comprises a magnetorheological foam.

13. A bridgeplug as described by claim 11 wherein said second stiffness property is maintained by a magnetic field.

* * * * *